United States Patent
Kim et al.

(10) Patent No.: US 10,403,406 B2
(45) Date of Patent: Sep. 3, 2019

(54) LOWER END FIXING BODY FOR IMPROVING FLOW PATH RESISTANCE OF IN-CORE DETECTOR

(71) Applicant: KEPCO NUCLEAR FUEL CO., LTD., Daejeon (KR)

(72) Inventors: Jin Sun Kim, Daejeon (KR); Jae Ik Kim, Daejeon (KR); Sang Youn Jeon, Daejeon (KR); Kyong Bo Eom, Daejeon (KR); Dong Geun Ha, Daejeon (KR); Seong Soo Kim, Daejeon (KR); Joo Young Ryu, Daejeon (KR); O Cheol Kwon, Daejeon (KR); Su Pil Ryu, Daejeon (KR); Hak In Lee, Daejeon (KR); Joo Hong Chun, Daejeon (KR); Ba Leum Kim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 176 days.

(21) Appl. No.: 15/515,130

(22) PCT Filed: Oct. 22, 2015

(86) PCT No.: PCT/KR2015/011223
§ 371 (c)(1),
(2) Date: Mar. 28, 2017

(87) PCT Pub. No.: WO2016/093487
PCT Pub. Date: Jun. 16, 2016

(65) Prior Publication Data
US 2017/0243663 A1    Aug. 24, 2017

(30) Foreign Application Priority Data
Dec. 11, 2014 (KR) .................. 10-2014-0178533

(51) Int. Cl.
*G21C 3/322* (2006.01)
*G21C 17/10* (2006.01)
(Continued)

(52) U.S. Cl.
CPC ........... *G21C 3/322* (2013.01); *G21C 3/3305* (2013.01); *G21C 15/02* (2013.01); *G21C 17/10* (2013.01); *G21C 17/108* (2013.01); *Y02E 30/38* (2013.01)

(58) Field of Classification Search
CPC ...... G21C 3/322; G21C 3/3305; G21C 15/02; G21C 17/10; G21C 17/108
(Continued)

(56) References Cited

U.S. PATENT DOCUMENTS 5,488,634 A * 1/1996 Johansson ............ G21C 3/3206
376/352
5,867,550 A * 2/1999 Beuerlein ............ G21C 3/3206
376/352
(Continued)

FOREIGN PATENT DOCUMENTS

JP          06-027274 A      2/1994
KR   10-1994-0002701 B1    10/2000
(Continued)

*Primary Examiner* — Jack W Keith
*Assistant Examiner* — Daniel Wasil
(74) *Attorney, Agent, or Firm* — Rabin & Berdo, P.C.

(57) ABSTRACT

The present invention relates to a lower end fitting for reducing flow resistance due to an in-core instrument in a nuclear fuel assembly, that is, a lower end fitting (100) having a plurality of flow holes for a nuclear fuel assembly, in which the flow holes (121) are formed under an assembly groove in which an instrumentation tube (131) for a nuclear fuel assembly is inserted, and at least two or more flow holes (121) are formed at a predetermined distance from the central axis (C) of the instrumentation tube (131).

2 Claims, 2 Drawing Sheets

(51) Int. Cl.
*G21C 17/108* (2006.01)
*G21C 3/33* (2006.01)
*G21C 15/02* (2006.01)

(58) Field of Classification Search
USPC .................. 376/352, 443, 362, 313, 254
See application file for complete search history.

(56) References Cited

U.S. PATENT DOCUMENTS

| | | |
|---|---|---|
| 2003/0016776 A1 | 1/2003 | Smith et al. |
| 2005/0157836 A1 | 7/2005 | Broach et al. |

FOREIGN PATENT DOCUMENTS

| | | |
|---|---|---|
| KR | 10-2004-0040432 A | 5/2004 |
| KR | 10-2005-0072054 A | 7/2005 |
| KR | 10-2000-0061665 A | 7/2010 |
| KR | 10-2011-0103392 A | 7/2010 |
| KR | 10-0984018 B1 | 9/2010 |
| KR | 10-2014-0019923 A | 2/2014 |
| WO | WO 2010/077906 A1 | 7/2010 |

\* cited by examiner

LOWER END FIXING BODY FOR IMPROVING FLOW PATH RESISTANCE OF IN-CORE DETECTOR

TECHNICAL FIELD

The present invention relates to a lower end fitting for reducing flow resistance due to an in-core instrument in a nuclear fuel assembly.

BACKGROUND ART

An in-core instrument (ICI) is a device for measuring the output of a nuclear reactor by measuring the density and temperature of neutron flux in a core of the nuclear reactor.

In the related art, in-core instruments were inserted into a core through the bottom of a reactor vessel, but there was a problem that the substances in the core of a reactor may leak through the hole formed through the bottom of the reactor vessel.

In order to solve this problem, all in-core instruments have been disposed close to a core through a hole at the top of a reactor vessel instead of the way of inserting them through the bottom of a reactor vessel.

In-core instruments inserted through the closure head reach the inside the nuclear fuel assembly through instrumentation tubes and their ends block cooling holes in the lower end fitting for the nuclear fuel assembly, depending on the insertion positions, so the flow rate of cooling water that flows into the instrumentation tubes may not be sufficiently secured.

RELATED ART DOCUMENT

1. Korean Patent No. 10-0984018 (registered on Sep. 17, 2010)
2. Korean Patent Application Publication No. 10-2011-0103392 (published on Sep. 20, 2011)
3. Korean Patent Application Publication No. 10-2000-0061665 (published on Oct. 25, 2000)

DISCLOSURE

Technical Problem

In order to solve the problems in the related art, an object of the present invention is to provide a lower end fitting for reducing flow resistance due to an in-core instrument in a nuclear fuel assembly.

Technical Solution

In order to accomplish the above object, the present invention provides a lower end fitting for a nuclear fuel assembly of the present invention that has flow holes for cooling an in-core instrument for a nuclear fuel assembly, in which at least two or more flow holes are formed at a predetermined distance from the central axis of an instrumentation tube.

In the present invention, the flow holes may be arranged symmetrically around the central axis of the instrumentation tube.

Advantageous Effects

According to the lower end fitting of the present invention, a plurality of flow holes for supplying cooling water to an instrumentation tube is circumferentially symmetrically arranged at a predetermined distance from the central axis of an instrumentation tube, so even if an end of the instrumentation tube comes in contact with a flow channel plate, the flow holes are not blocked, so smooth flow of cooling water can be secured and it is possible to reduce vibration of an in-core instrument and prevent frictional damage to the in-core instrument.

BEST MODE

Specific structures and functions stated in the following embodiments of the present invention are exemplified to illustrate embodiments according to the spirit of the present invention and the embodiments according to the spirit of the present invention can be achieved in various ways. Further, the present invention should not be construed as being limited to the following embodiments and should be construed as including all changes, equivalents, and replacements included in the spirit and scope of the present invention.

Further, in the specification, terms including "first" and/or "second" may be used to describe various components, but the components are not limited to the terms. The terms are used to distinguish one component from another component, and for instance, a first component may be referred to as a second component, and similarly, a second component may be referred to as a first component without being depart from the scope according to the spirit of the present invention.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "contact directly with" another element, it may be connected to or coupled to another element without the other element intervening therebetween. Expressions for describing relationships between components, that is, "between", "directly between", "adjacent to", and "directly adjacent to" should be construed in the same way.

Hereinafter, embodiments of the present invention will be described hereafter in detail with reference to the accompanying drawings.

Figure 1:
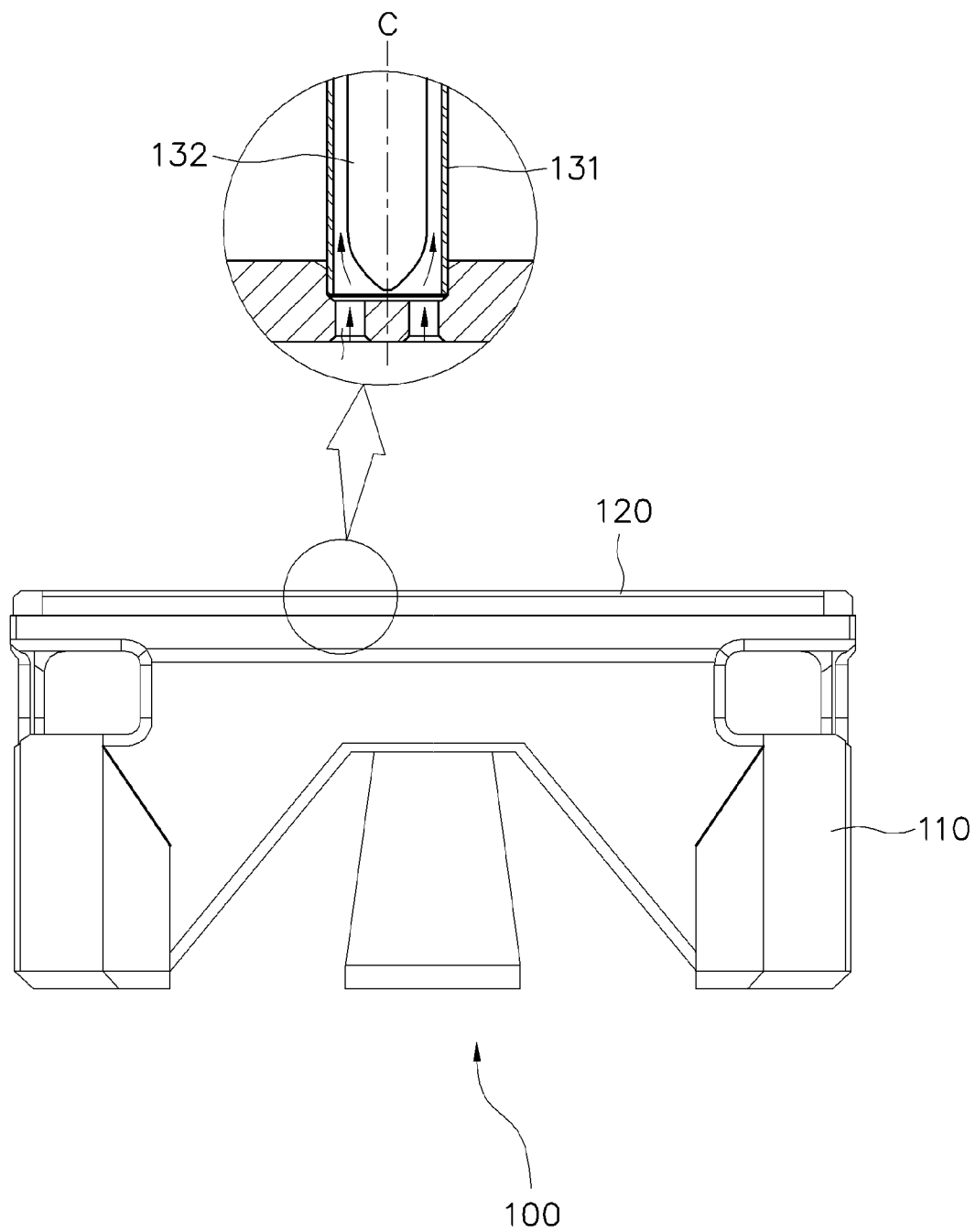
FIG. 1 is a view showing the configuration of a lower end fitting according to the present invention.
Figure 2A:
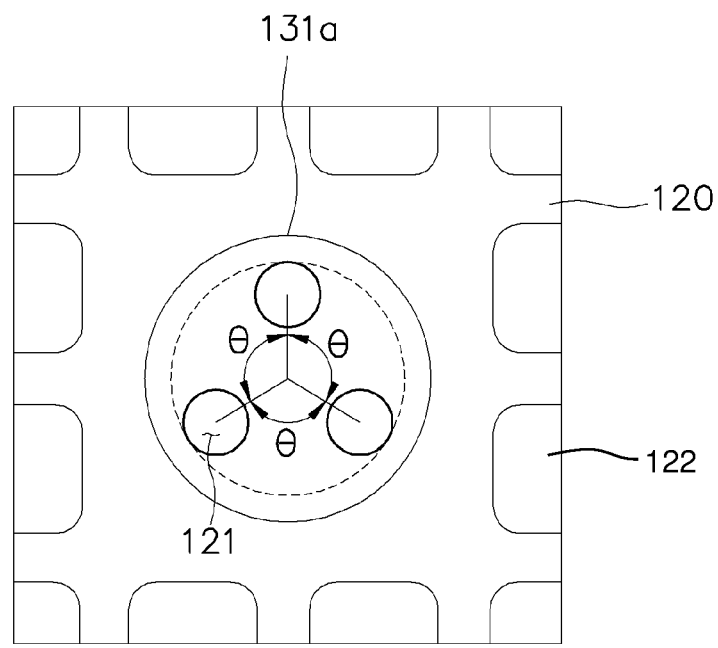
FIGS. 2A and 2B are views showing the structure of flow holes of a lower end fitting according to the present invention.
Figure 2B:
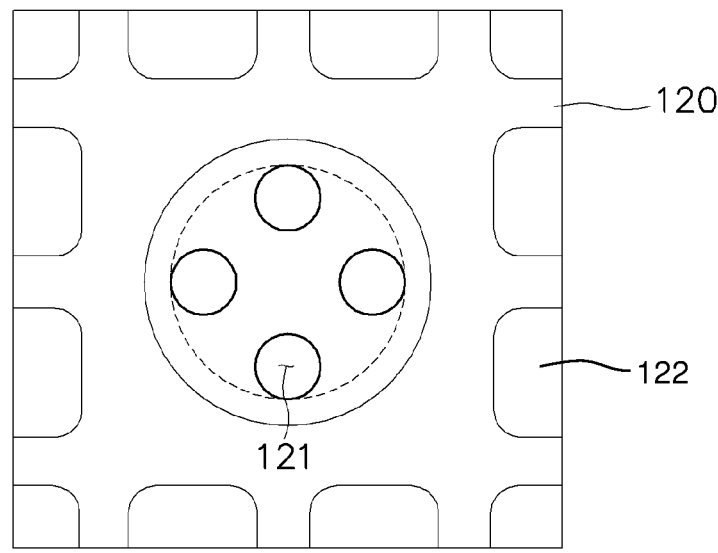

Referring to FIGS. 1, 2A, and 2B, a lower end fitting 100 of a nuclear fuel assembly includes a flow channel plate 120 having a plurality of flow holes 122 on an enclosure 110 and is disposed under a plurality of fuel rods supported a plurality of support grids.

According to the present invention, at least two or more flow holes 121 are formed under an assembly groove 131a in which an instrumentation tube 131 is inserted in the flow channel plate 120, and said at least two or more flow holes 121 are formed at a predetermined distance from the central axis C of the instrumentation tube 131.

The flow holes 121 may be symmetrically arranged (at 360°/n, n is the number of the flow holes) around the central axis C of the instrumentation tube 131 and may be spaced at the same distance from the central axis C of the instrumentation tube 131.

For example, when three flow holes 121 are provided, they may be arranged with an angle of 120° therebetween.

Reference numeral '131*a*' in FIGS. 2A and 2B indicates the assembly groove formed on which the flow channel plate 120 to insert an instrument tube.

According to the configuration of the lower end fitting of the present invention, since a plurality of holes is formed at a predetermined distance from the central axis C of the instrumentation tube 131 inside the assembly groove in which the instrumentation tube 131 is inserted, even if an end of an in-core instrument 132 comes in contact with the flow channel plate 120, the flow holes are not blocked, so smooth flow of cooling water can be secured.

Further, by the structure in which a plurality of flow holes is arranged symmetrically around the central axis of an instrumentation tube, cooling water can smoothly flow, so it is possible to reduce vibration of the in-core instrument and prevent frictional damage to the in-core instrument.

It will be apparent to those skilled in the art that the foregoing present invention is not limited by the foregoing embodiments and the accompanying drawings, and various modifications and changes may be made without departing from the scope and spirit of the invention.

<Description of the Reference Numerals in the Drawings>

| | |
|---|---|
| 100: Lower end fitting | 110: Enclosure |
| 120: Flow channel plate | 121: Flow hole |
| 131: Instrumentation tube | 132: In-core instrument |

What is claimed is:

1. A nuclear fuel assembly lower end fitting comprising:
   a flow channel plate on which a plurality of fuel rods and instrumentation tube are disposed;
   an assembly groove formed in the flow channel plate, wherein the instrumentation tube is inserted into the assembly groove, wherein an outer surface of the instrumentation tube contacts with a side wall of the assembly groove, wherein the assembly groove includes a center vertical axis;
   a plurality of first flow holes formed in the flow channel plate around the assembly groove; and
   a plurality of second flow holes formed in the flow channel plate under the assembly groove, wherein the second flow holes communicate with the assembly groove,
   wherein
      all of the second flow holes are spaced the same distance from the vertical axis at regular interval with each other, and
      none of the second flow holes extend under the vertical axis, and
      all of the second flow holes are spaced inward from the side wall of the assembly groove, wherein a lower end of the instrumentation tube does not block the second flow holes even when the lower end of the instrumentation tube contacts a bottom of the assembly groove.

2. The nuclear fuel assembly lower end fitting of claim 1, wherein the second flow holes are arranged symmetrically around the vertical axis.

* * * * *